Figures 1, 2, 3:
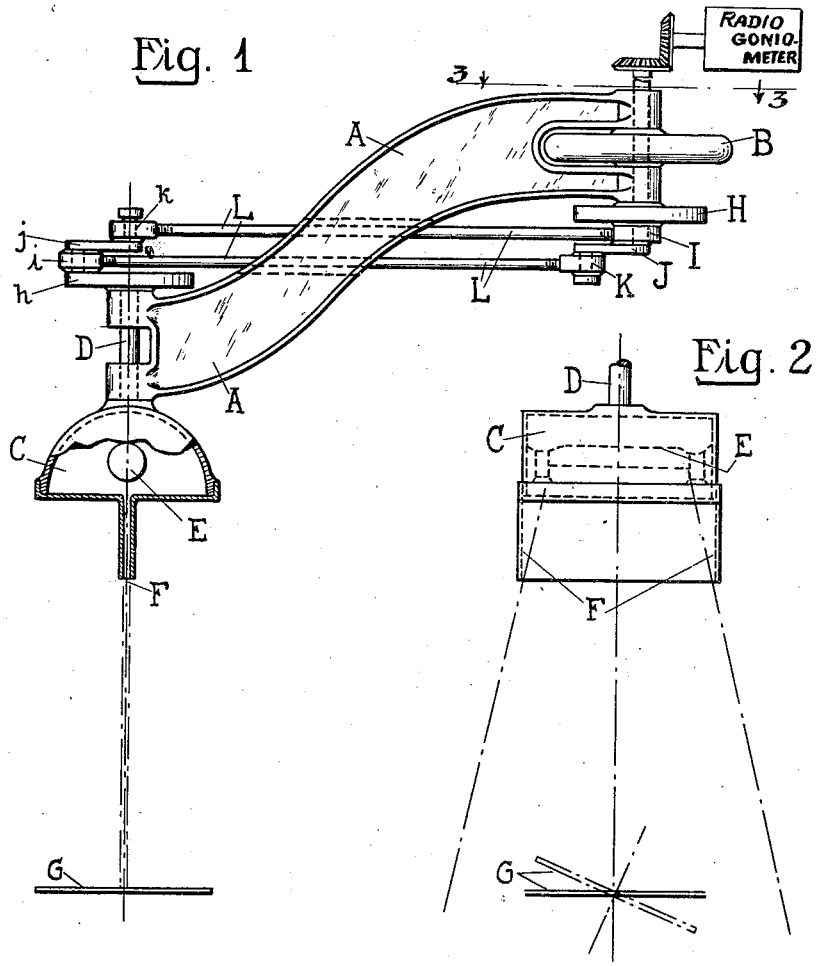

Inventor
JOHN A. SLEE
By his Attorney

May 6, 1930. J. A. SLEE 1,757,265
MEANS FOR INDICATING ANGULAR POSITION PARTICULARLY
APPLICABLE TO WIRELESS DIRECTION FINDING APPARATUS
Filed June 16, 1923 2 Sheets-Sheet 2

Inventor
JOHN A. SLEE
By his Attorney

Patented May 6, 1930

1,757,265

UNITED STATES PATENT OFFICE

JOHN AMBROSE SLEE, OF LONDON, ENGLAND, ASSIGNOR TO RADIO CORPORATION OF AMERICA, A CORPORATION OF DELAWARE

MEANS FOR INDICATING ANGULAR POSITION PARTICULARLY APPLICABLE TO WIRELESS DIRECTION-FINDING APPARATUS

Application filed June 16, 1923, Serial No. 645,897, and in Great Britain June 27, 1922.

Many ships are now fitted with wireless direction finding apparatus by which it is possible to determine the angle between the fore and aft line of the ship and the line joining the ship to a distant transmitting station. In order, however, that by the aid of this direction finding apparatus it shall be possible to ascertain the ship's position it is necessary that the true bearing of the distant station should be obtained and for this purpose it is necessary to compare the direction finder with a compass.

The primary object of this invention is to provide means whereby the direction of a distant transmitting station may be read upon a compass card and in order to make the invention clear it is here described with reference to that object, but it will be obvious that the invention is applicable to many other purposes where it is desired to compare the angular position of one rotating arm or scale with the angular position of another rotating arm or scale.

According to this invention means for projecting a thin beam of light is mounted so that it can rotate about an axis which passes through the centre of a dial which rotates beneath a fixed pointer or which is fixed with a pointer rotating above it, and this projector is so connected to another rotating pointer or dial that when this second pointer or dial is turned through any angle the projector is turned through the same angle.

The projector preferably consists of a straight incandescent filament lamp enclosed in a casing in the form of a U shaped trough the open side of which is in the form of a deep and narrow slot, the axis about which the projector can rotate lying in the central plane of this slot, while the filament intersects the axis at right angles. Thus a thin but wide beam of light can issue from the projector and will light up the dial first mentioned along a diameter.

Or I may employ in the projector two small lamps each arranged to show a bright spot with a shadow of cross wires in it.

The dial may be the moving card of a repeater of a gyro compass.

The projector is connected to the handle of the radiogoniometer of a wireless direction finder so that as the handle is turned the projector is turned through the same angle.

Instead of the projector being connected to a handle or pointer or to a dial rotating beneath a fixed pointer it may be connected to a similar projector arranged to illuminate a diameter of a dial so that when one of the projectors is rotated through any angle the other projector will be rotated through the same angle and this angle can be read on either of the dials.

Figure 4:
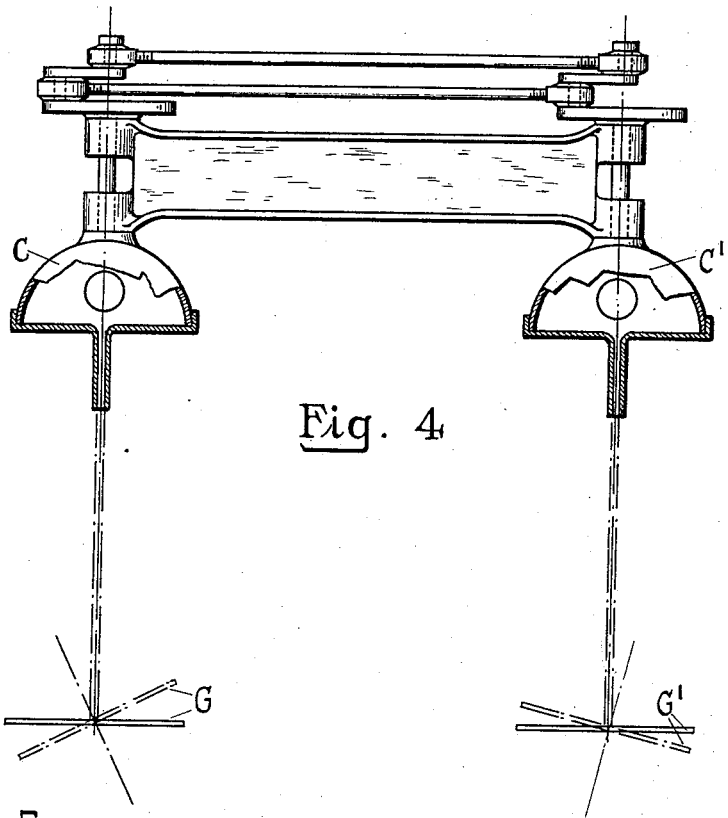

My invention is illustrated by the accompanying drawings, Figure 1 of which is an elevation, Figure 2 a view of part of the apparatus at right angles to Figure 1, and Figure 3 is a plan. Figure 4 is an elevation of a modification, Figure 5 is a view similar to Figure 2 showing a modified form of projector and Figure 6 is an underside view of Figure 5.

In Figure 1, A is a bracket which supports a hand wheel B which may be connected to the search coil of the radiogoniometer of a wireless direction finder. C is a projector carried by a spindle D also supported in the bracket A; the projector contains a straight filament lamp E with the filament intersecting the axis of spindle D at right angles. The casing of the lamp has formed in its underside a deep narrow slot F so that a thin but wide beam of light issues from the slot. G is a compass card the centre of which lies in the axis of the spindle D. Thus the projector C will cause a line of light to appear along a diameter of the card not only when the plane of the card is normal to the axis of the spindle D, as shown in Figure 1 but even if it be tilted with respect thereto as shown in dotted lines in Figure 2. Fast with the hand wheel B is a disk H which has projecting downwards from it a pin I fast with a bar J which carries a second pin K. On the spindle D is fast a disk $h$ having projecting from it a pin $i$ fast with a bar $j$ which carries a pin $k$. L, L, are two rods which connect the pin K to the pin $i$ and pin I to the pin $k$. The two rods L, L, and the two bars J $j$ form a parallel motion. It will be seen that for any angular movement of the hand wheel B there will be an equal angular movement of the line of light on the card G.

Figure 4 shows an arrangement in which two projectors C C¹ are linked together by mechanism similar to that described for linking together the hand wheel B and a projector, so that as the projector, C¹ for instance, is turned to keep its line of light on a definite diameter of a compass card, G¹, the line of light projected from C will indicate on a dial G the movements of the diameter of the compass card.

Figure 5:
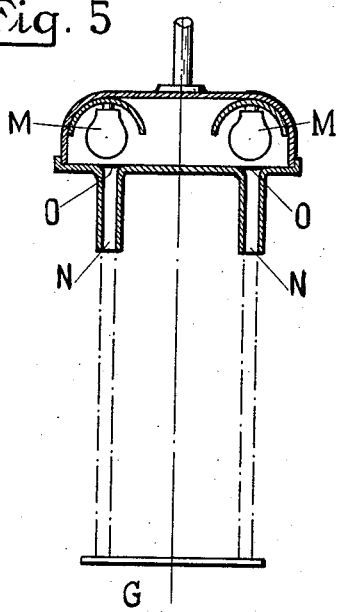
Figure 6:
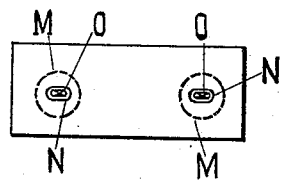

Figures 5 and 6 show a modified form of projector in which the straight filament lamp E is replaced by two small lamps M M and the casing has a slot N beneath each lamp with cross wires O in each slot so that spots of light with shadows of the cross wires appear on the card or dial G.

Having described my invention what I claim is:—

1. In combination a radio direction finder, a compass card, means to project a thin beam of light along a diameter of said card, and a single manual means to orient simultaneously said radio direction finder and said light projecting means.

2. In a radio compass, the combination of directional receiving apparatus, a scale for indicating the position of said receiving apparatus with respect thereto, a bracket, a light projector carried by said bracket and adapted to project a narrow beam of light upon said scale, and means including a pair of parallel connecting links connecting said receiving apparatus and said projector to vary the position of said beam with respect to said scale in accordance with the variation in directional characteristic of said receiver.

3. In a radio compass, the combination of directional receiving apparatus, a compass card, a bracket, a light projector carried by said bracket and adapted to project on a diameter of said compass card a narrow beam of light and manual means for causing the position of said beam of light to shift in accordance with variations in the directional characteristic of said receiving apparatus.

4. In a radio compass, the combination of a rotatable directional receiving system adapted to determine the direction of a transmitting station, a compass card and rotatable means for indicating upon said compass card the direction of said transmitting station comprising a projector adapted to project a narrow beam of light along a diameter of said compass card and manual means for rotating said projector in synchronism with said receiver to indicate upon said card the direction of said transmitter.

5. In a radio compass in combination, radio receiving apparatus adapted to determine the direction of a source of transmitted signals, a compass card, and means for indicating upon said compass card the bearing of said source comprising a rotatable light projector adapted to project upon said card an indicating beam of light, and manual means operatively connecting said receiving apparatus and said projector to cause said projector to indicate upon said card the bearing of said source.

6. In combination a radio direction finder, a compass card, a support, rotatable means for projecting a long narrow beam of light along a diameter of said compass card carried by said support, and manual rotatable means carried by said support associated with said radio direction finder and said beam projector whereby rotation of said manual means causes simultaneous equal rotation of said direction finder and said beam projector.

7. In combination, a radio direction finder, a bracket, rotatable means located in each end of said bracket, a directive receiver associated with one of said rotatable means, a light beam projector associated with the other of said rotatable means, a compass card so located that its center is crossed by a thin beam of light from said projector, and parallel links connecting said rotatable means whereby rotation of said directive receiver causes equal angular rotation of the light beam on said compass card.

8. In a radio compass, a bracket, a bearing in one end thereof, a hand wheel mounted in said bearing, a directive aerial rotated by said hand wheel, a disk fast to said hand wheel, a second bearing in said bracket, a shaft carrying an indicator and a second disk mounted for rotation in said last named bearing, a pair of pins integral with each of said disks, and links between the pairs of pins, whereby rotation of the hand wheel causes a like rotation of the indicator.

9. In a radio compass, the combination of a directional receiving system adapted to determine the direction of a transmitting station, a bracket, a hand wheel mounted in one end of said bracket, means connecting said hand wheel to said receiving system, a projector mounted in the other end of said bracket, means including parallel links between disks connected to said hand wheel and to said projector respectively for connecting said projector and said hand wheel for simultaneous equal angular movement, and means cooperating with said projector whereby the angular movement of said receiving system may be read.

JOHN AMBROSE SLEE.